(12) United States Patent
Liao

(10) Patent No.: US 11,218,047 B2
(45) Date of Patent: Jan. 4, 2022

(54) PLASTIC MOTOR FOR HANDHELD STABILIZER

(71) Applicant: GUILIN ZHISHEN INFORMATION TECHNOLOGY CO., LTD., Guzngxi (CN)

(72) Inventor: Yilun Liao, Guangxi (CN)

(73) Assignee: GUILIN ZHISHEN INFORMATION TECHNOLOGY CO., LTD., Guzngxi (CN)

( * ) Notice: Subject to any disclaimer, the term of this patent is extended or adjusted under 35 U.S.C. 154(b) by 152 days.

(21) Appl. No.: 16/068,790

(22) PCT Filed: Apr. 9, 2018

(86) PCT No.: PCT/CN2018/082303
§ 371 (c)(1),
(2) Date: Jul. 9, 2018

(87) PCT Pub. No.: WO2018/188550
PCT Pub. Date: Oct. 18, 2018

(65) Prior Publication Data
US 2021/0211010 A1    Jul. 8, 2021

(30) Foreign Application Priority Data

Apr. 11, 2017 (CN) .......................... 201710232750.5
Apr. 11, 2017 (CN) .......................... 201710233007.1

(51) Int. Cl.
*H02K 5/08* (2006.01)
*H02K 5/02* (2006.01)
(Continued)

(52) U.S. Cl.
CPC ............... *H02K 5/08* (2013.01); *F16M 11/06* (2013.01); *H02K 5/02* (2013.01); *H02K 5/165* (2013.01);
(Continued)

(58) Field of Classification Search
CPC ............ H02K 7/003; H02K 7/14; H02K 5/07; H02K 5/08; H02K 5/02; F16M 11/14
(Continued)

(56) References Cited

U.S. PATENT DOCUMENTS 9,816,666 B2    11/2017    Wang et al.
10,491,060 B2   11/2019    Wang et al.
(Continued)

FOREIGN PATENT DOCUMENTS

CN    2390343 Y    8/2000
CN    1949632 A    4/2007
(Continued)

*Primary Examiner* — Terrance L Kenerly
(74) *Attorney, Agent, or Firm* — Rimon, P.C.

(57) ABSTRACT

The present invention provides a plastic motor for a handheld stabilizer, comprising an upper bearing, a lower bearing, motor iron cores, an iron core carrier, a hollow metal motor shaft, a locking structure, a motor shell and a motor end cover, wherein at least one of the iron core carrier, the motor shell and the motor end cover is made of plastic material, the hollow metal motor shaft passes through the center of the upper bearing, the iron core carrier and the lower bearing in sequence, and a locking structure is provided at the other end of the hollow metal motor shaft. By the plastic motor for a handheld stabilizer disclosed in the present invention, problems in the prior art such as high cost of motors for handheld stabilizers, low production efficiency, difficulty in threading, tending to deform after loading and short service life are solved.

19 Claims, 9 Drawing Sheets

(51) Int. Cl.
*H02K 7/00* (2006.01)
*H02K 7/14* (2006.01)
*F16M 11/06* (2006.01)
*H02K 5/16* (2006.01)
*F16M 13/04* (2006.01)

(52) U.S. Cl.
CPC ............... *H02K 7/003* (2013.01); *H02K 7/14* (2013.01); *F16M 13/04* (2013.01)

(58) Field of Classification Search
USPC .......................................................... 310/43
See application file for complete search history.

(56) References Cited

U.S. PATENT DOCUMENTS

| | | | |
|---|---|---|---|
| 2002/0090506 A1 | 7/2002 | Protzner et al. | |
| 2004/0036371 A1* | 2/2004 | Kuwert | G11B 19/2009 310/90 |
| 2013/0028761 A1 | 1/2013 | Yokozawa et al. | |
| 2014/0099221 A1* | 4/2014 | Tanahashi | H02K 3/522 417/423.7 |
| 2015/0261070 A1 | 9/2015 | Feng et al. | |

FOREIGN PATENT DOCUMENTS

| | | | | |
|---|---|---|---|---|
| CN | 201226473 | Y | 4/2009 | |
| CN | 202178625 | U | 3/2012 | |
| CN | 104135101 | A | 11/2014 | |
| CN | 105584637 | A | 5/2016 | |
| CN | 105736925 | A | 7/2016 | |
| CN | 106803696 | A | 6/2017 | |
| CN | 106849453 | A | 6/2017 | |
| CN | 206619984 | U | 11/2017 | |
| CN | 206759201 | U | 12/2017 | |
| DE | 102007056206 | A1 | 5/2009 | |
| EP | 1406027 | A1 | 4/2004 | |
| JP | S61236350 | A | 10/1986 | |
| JP | H07255152 | A | 10/1995 | |
| JP | 2002185156 | A | 6/2002 | |
| JP | 2006329391 | A | 12/2006 | |
| JP | 2007263225 | A | 10/2007 | |
| JP | 2013024217 | A | 2/2013 | |
| JP | 2015177539 | A | 10/2015 | |
| JP | 2016017993 | A | 2/2016 | |
| WO | WO-2015196487 | A1 * | 12/2015 | ............ F16M 11/12 |
| WO | WO-2016115921 | A1 | 7/2016 | |

* cited by examiner

PLASTIC MOTOR FOR HANDHELD STABILIZER

CROSS-REFERENCE TO RELATED APPLICATIONS

This application is a national stage application (under 35 U.S.C. § 371) of PCT/CN2018/082303, filed Apr. 9, 2018, which claims benefit of Chinese Application No. 201710233007.1, filed Apr. 11, 2017, and Chinese Application No. 201710232750.5, also filed Apr. 11, 2017, all of which are incorporated herein by reference in their entirety.

TECHNICAL FIELD

The present invention relates to a plastic motor and in particular to a plastic motor for a handheld stabilizer.

BACKGROUND

With the maturity of camera phone technologies and the drop in price, mobile photography is becoming increasingly popular. More and more people who have certain quality requirements on pictures begin to use handheld stabilizers to stabilize the mobile phone. Motors, as a key executing mechanism, are particularly important. Most of motors in conventional handheld stabilizers are made of metal material, Though metal material has great stability, there are problems such as long production cycle, high procurement price, large weight, poor appearance designability and difficulty in threading. Therefore, the price of the handheld stabilizers is high and it is not helpful for popularization and development of the handheld stabilizers.

In the prior art, Chinese Patent Publication CN1949632A disclosed a method for mounting a plastic motor housing and a bearing device. In the method, a plastic motor housing having a bearing chamber is first made by using injection molding process for standby. An oil bearing and a piece of oil-impregnated felt are provided within the bearing chamber of the plastic housing, and then a gland is fixed on the bearing chamber to fix the oil bearing and the piece of oil-impregnated felt within the bearing chamber. The method is simple in process and low in manufacturing cost.

However, the plastic motor housing and the motor shaft of the motor are separated, and there are also problems such as difficulty in wiring, low strength, tending to deform and poor shaft stability during mounting and usage, which result in a short service life of the motor.

SUMMARY

In view of the technical problems in the prior art, the present invention provides a plastic motor for a handheld stabilizer, to solve problems in the existing stabilizers such as long production cycle for the metal motor, high price, large weight, poor appearance designability and difficulty in threading.

An embodiment of the present invention provides a plastic motor for a handheld stabilizer, comprising:
a motor shell;
a hollow metal motor shaft having one end fixedly connected to the motor shell;
a motor end cover;
motor iron cores;
an iron core carrier, wherein one end of the iron core carrier is detachably connected with the motor end cover and the other end thereof carries the motor iron cores, and at least one of the iron core carrier, the motor shell and the motor end cover is made of plastic material; and
an upper bearing and a lower bearing, wherein the upper bearing and the lower bearing are fixed on the iron core carrier, and the hollow metal motor shaft passes through the upper bearing, the iron core carrier and the lower bearing.

Preferably, there is a locking structure at the other end of the hollow metal motor shaft.

Preferably, the motor end cover and the motor shell are arranged opposite to each other, and the iron core carrier is arranged in the interior of the motor shell and the motor end cover.

Preferably, the locking structure of the hollow metal motor shaft is a threaded structure, a mortise and tenon structure or a snap-fit structure formed on an outer wall of the other end of the hollow metal motor shaft.

Preferably, a stopping component fixedly connected to an inner side of the motor shell is provided on an outer side of one end of the hollow metal motor shaft.

Preferably, the stopping component at one end of the hollow metal motor shaft is at least one of a groove, a projection and an irregularly deformed structure.

Preferably, the motor shell is made of plastic material, and the connection between one end of the hollow metal motor shaft and the motor shell is injection molding connection, glue connection or interference connection.

Preferably, the plastic material of the motor shell is polyaryl amides, so that extremely high strength and hardness, and great chemical resistance and dimensional stability can be achieved, and the motor can maintain great stability in the case of high load.

Preferably, the motor shell is of a cylindrical shape with one end open and comprises an annular wall and a bottom plate, the hollow metal motor shaft is arranged on a central axis of the motor shell, and one end of the hollow metal motor shaft is fixedly connected with an inner side of the bottom plate.

Preferably, a lead trough is provided on an outer side of the bottom plate and is communicated with the interior of the hollow metal motor shaft.

Preferably, reinforcing ribs are provided on the inner side of the bottom plate.

Preferably, the plastic motor further comprises a magnetic ring and a plurality of magnetic ring limiting members provided on an inner side of the annular wall, wherein one end of each of the magnetic ring limiting members is fixed to an end of the reinforcing rib and the other end thereof is abutted against the magnetic ring.

Preferably, a rotary stopper is provided on an outer wall of the annular wall, and a rotary limiting member is provided on the outer edge of the iron core carrier.

Preferably, the iron core carrier comprises an annular boss, and an outer wall of the annular boss is fixedly connected with an inner wall of the motor iron core.

Preferably, a limiting projection is provided on the outer wall of the annular boss, and a limiting groove fitted with the limiting projection is provided in the inner wall of the motor iron core; or a limiting groove is provided in the outer wall of the annular boss, and a limiting projection fitted with the limiting groove is provided on the inner wall of the motor iron core. During the operation of the motor, the relative movement between the motor iron cores and the iron core carrier is limited.

The present invention further provides a handheld stabilizer, comprising:

two plastic motors described above; and a connecting arm used for fixedly connecting a motor end cover of a first plastic motor of the two plastic motors and a motor shell of a second plastic motor of the two plastic motors, wherein a wiring groove is provided in the connecting arm and is communicated with the interior of a hollow metal motor shaft of the second plastic motor.

The present invention further provides a handheld stabilizer, comprising:

three plastic motors described above;

a first connecting arm, wherein the first connecting arm fixedly connects a motor end cover of a first plastic motor of the three plastic motors and a motor shell of a second plastic motor of the three plastic motors, and a first wiring groove is provided in the first connecting arm and is communicated with the interior of a hollow metal motor shaft of the second plastic motor; and a second connecting arm, wherein the second connecting arm fixedly connects a motor shell of the first plastic motor and a motor end cover of a third plastic motor of the three plastic motors, and a second wiring groove is provided in the second connecting arm and is communicated with the interior of a hollow metal motor shaft of the first plastic motor.

The present invention has the following beneficial effects:

1. One or more components of the iron core carrier, the motor shell and the motor end cover are made of plastic material, so that complex technological processes such as polishing and cleaning during the production of the existing metal motors are avoided, resulting in an improved production efficiency and a reduced cost;

2. The hollow metal motor shaft is fixedly connected with the plastic motor shell by injection molding, glue and interference, so that it is less likely for the motor shaft to deform after loading; meanwhile, the use of the hollow motor shaft facilitates the threading of the handheld stabilizer;

3. A stopping structure is additionally provided to an end of the hollow metal motor shaft fixedly connected with the motor shell, so that the stability of the motor during usage is improved and the service life of the motor is prolonged;

4. A limiting structure in a circumferential direction is additionally provided to the outer wall of the annular boss and the inner wall of the motor iron core, so that the stability of the motor during usage is improved;

5. With the use of polyaryl amides, the strength, the hardness, the chemical resistance and the dimensional stability of the motor are improved, and the motor can maintain great stability in the case of high load; and 6. During the operation of the motor, the relative movement between the motor iron cores and the iron core carrier is limited by the annular boss on the iron core carrier and the limiting structure on the motor iron cores.

BRIEF DESCRIPTION OF THE DRAWINGS

The embodiments of the present invention will be further described below with reference to the accompanying drawings, in which.

Figure 1:
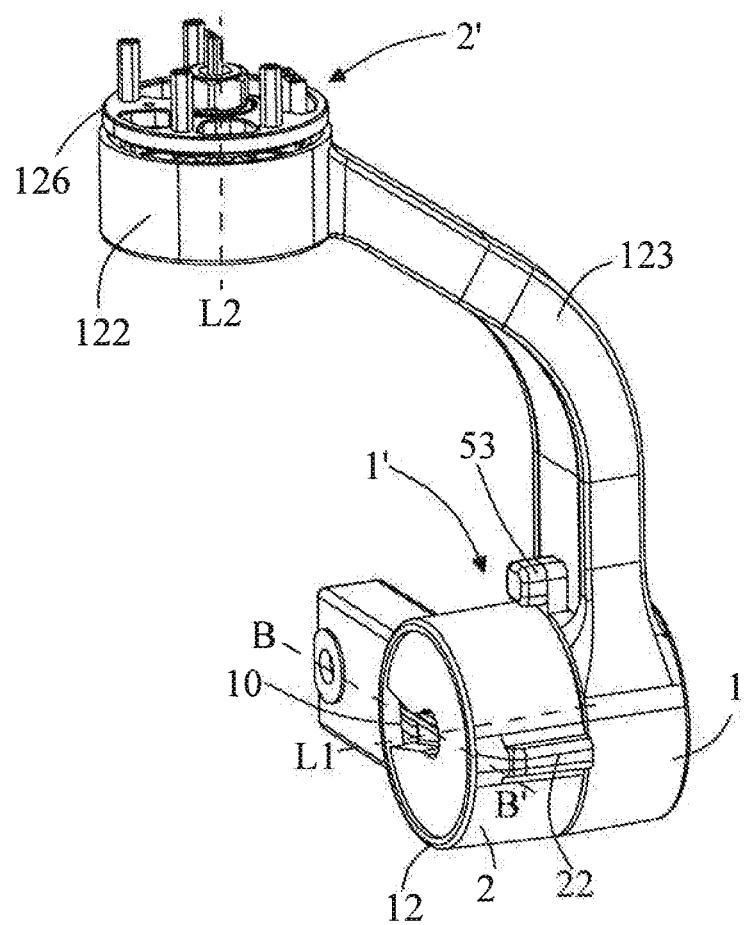
FIG. 1 is a schematic perspective view of a part of a handheld stabilizer according to a first embodiment of the present invention.

REFERENCE NUMERALS 1 motor end cover
2 motor shell
3 hollow metal motor shaft
4 motor iron core
5 iron core carrier
51 annular boss
52 limiting structure
6 upper bearing
7 lower bearing
8 locking structure
9 stopping structure
10 lead trough
11 screw
12 housing
13 lead strand
1' first plastic motor
11' first plastic motor
2' second plastic motor
22' second plastic motor
3' third plastic motor
122 housing
123 connecting arm
123' connecting arm
1231 wiring groove
124 hollow metal motor shaft
125 connecting arm
126 iron core carrier
127 handle
1220 lead trough
21 receiving space
22 rotary stopper
23 hollow metal motor shaft
25 magnetic ring
201 annular wall
202 bottom plate
203 magnetic ring limiting member
204 reinforcing rib
231 snap-fit structure
239 groove
239' projection
31 locking end
32 fixing end
31' motor end cover
32' housing 33 hollow metal motor shaft
339' projection
331 mortise structure
41 limiting groove
53 rotary limiting member
54 threaded hole

DETAILED DESCRIPTION

To make the objectives, technical solutions and advantages of the present invention more clear, the present invention will be further described below in details with reference to the accompanying drawings by way of specific embodiments.

FIG. 1 is a schematic perspective view of a part of a handheld stabilizer according to a first embodiment of the present invention. As shown in FIG. 1, the handheld stabilizer comprises a first plastic motor 1', a second plastic motor 2' and a connecting arm 123 connecting the two plastic motors together. The first plastic motor 1' is substantially cylindrical, comprising a motor end cover 1 and a housing 12 opposite to each other, and motor iron cores 4 and an iron core carrier 5 provided in the interior of the housing 12 and the motor end cover 1 (referring to FIG. 2). The housing 12 comprises a motor shell 2 made of plastic material, a lead trough 10 arranged on the motor shell 2, and a rotary stopper 22 arranged on an outer wall of the motor shell 2. Rotation of the rotary stopper 22 is limited by a rotary limiting member 53 (which will be described below with reference to FIG. 2). FIG. 1 also shows a housing 122 and an iron core carrier 126 of the second plastic motor 2', wherein the iron core carrier 126 is arranged in the interior of a handle 127 (referring to FIG. 12) of the handheld stabilizer. A central axis L2 of the housing 122 is perpendicular to a central axis L1 of the housing 12. The housing 122 of the second plastic motor 2' is connected to the motor end cover 1 of the first plastic motor 1' by the curved connecting arm 123. The second plastic motor 2' has basically the same structure as the first plastic motor 1', thus the structure thereof will be described below with reference to the first plastic motor 1'.

Figure 2:
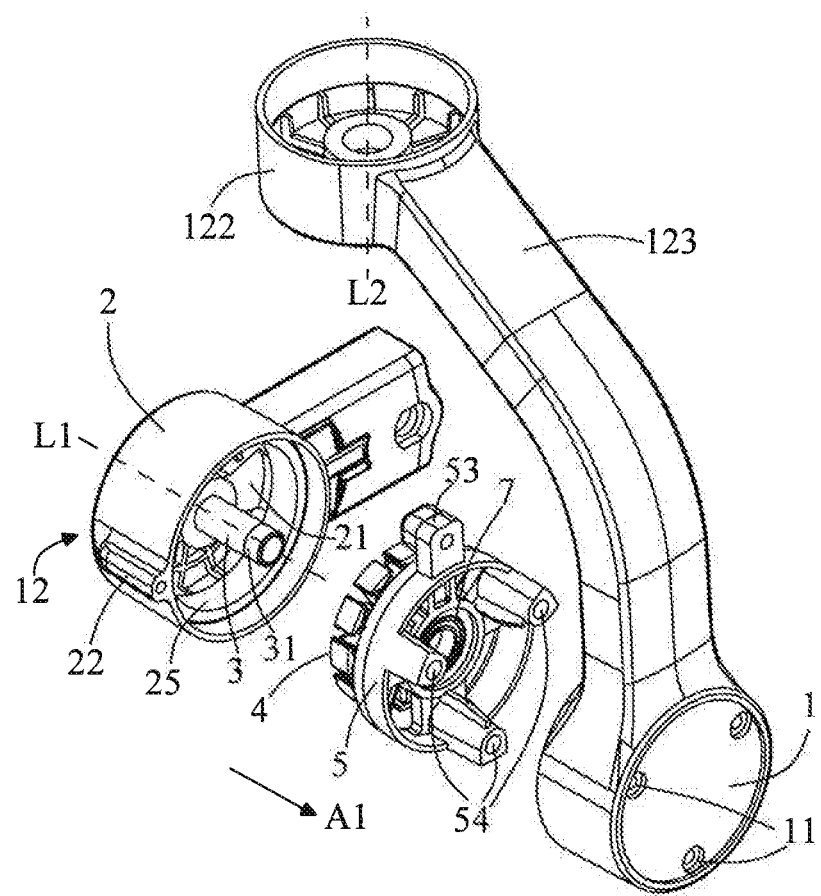
FIG. 2 is an exploded view of a first plastic motor for the handheld stabilizer shown in FIG. 1.

FIG. 2 is an exploded view of the first plastic motor 1' for the handheld stabilizer of FIG. 1. As shown in FIG. 2, the first plastic motor 1' comprises three parts: the motor end cover 1, the iron core carrier 5 and the housing 12, wherein the motor end cover 1 is of a cylindrical shape with one end open and forms a part of the connecting arm 123, and three through holes are formed in its end surface for nuts 11 to pass through. The iron core carrier 5 is substantially annular, and three threaded holes 54 corresponding to the three through holes are formed in its periphery. The nuts 11 can be fastened in the threaded holes 54 after passing through the through holes in the motor end cover 1, so that the iron core carrier 5 is detachably connected to the motor end cover 1. The motor iron cores 4 are fixedly mounted on the iron core carrier 5, a rotary limiting member 53 is provided on the outer edge of the iron core carrier 5, and an upper bearing 6 (referring to FIG. 7) and a lower bearing 7 opposite to each other are mounted at two opposite ends in the interior of its hollow center.

The housing 12 comprises a motor shell 2, and the motor shell 2 is of a cylindrical shape with one end open, which defines a cylindrical receiving space 21. The housing 12 also comprises an annular magnetic ring 25 provided in the receiving space 21 and fixed on an inner wall of the motor shell 2, and a hollow metal motor shaft 3. The hollow metal motor shaft 3 is coincided with the central axis L1 of the motor shell 2, is made of metal material and has a locking end 31 and a fixing end (referring to FIGS. 5 and 6) opposite to each other. The fixing end of the hollow metal motor shaft 3 is fixedly connected to an inner side of the motor shell 2.

Figure 3:
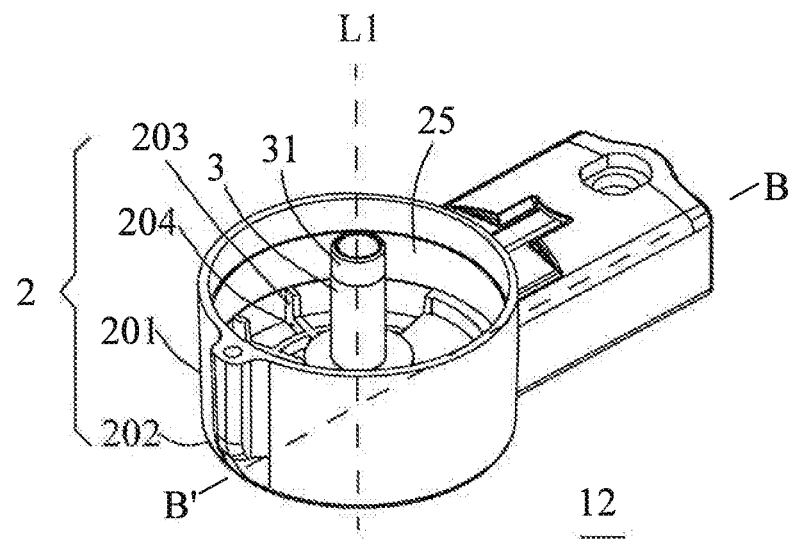
FIG. 3 is an enlarged perspective view of a housing of FIG. 2.
Figure 4:
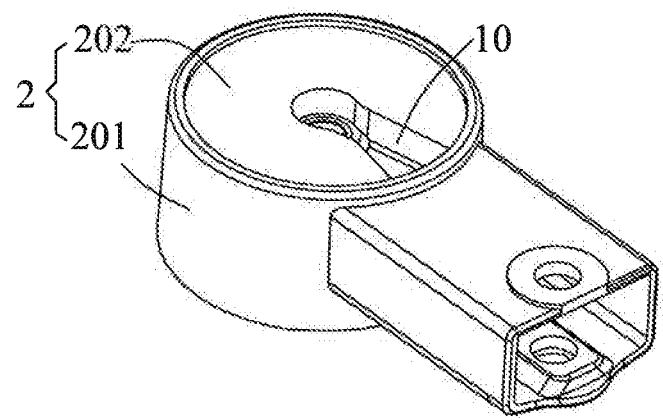
FIG. 4 is a bottom view of the housing of FIG. 3.
Figure 5:
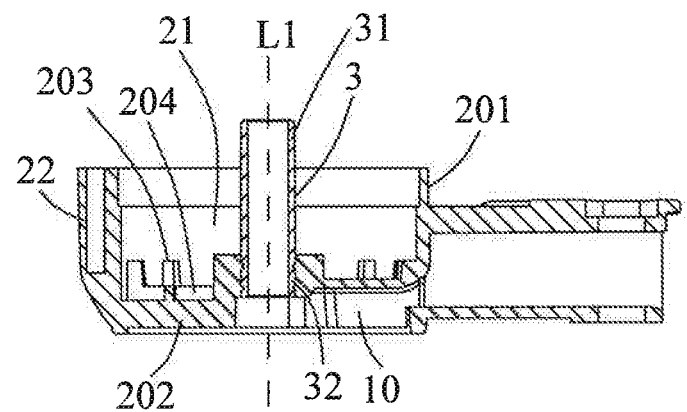
FIG. 5 is a sectional view of the housing of FIG. 3.

FIG. 3 is an enlarged perspective view of the housing 12 of FIG. 2, FIG. 4 is a bottom view of the housing 12 of FIG. 3, and FIG. 5 is a sectional view of the housing 12 of FIG. 3, with the sectional plane going through the central axis L1 and a line B-B'. As shown in FIGS. 3 to 5, the motor shell 2 is integrally molded by plastic material, comprising an annular wall 201, a bottom plate 202, a plurality of reinforcing ribs 204 provided on the bottom plate 202, and a plurality of magnetic ring limiting members 203 provided on an inner side of the annular wall 201. The reinforcing ribs 204 are radially distributed around the center of the bottom plate 202, and the reinforcing ribs 204 are linear to improve the mechanical strength of the bottom plate 202. The magnetic ring limiting members 203 are uniformly distributed along the inner side of the annular wall 201. One end of each of the magnetic ring limiting members 203 is fixed to an end of the reinforcing rib 204 and the other end thereof is abutted against the mounted magnetic ring 25 to support and limit the magnetic ring 25, so that the magnetic ring 25 is fixed in the desired position. The reinforcing ribs 204 and the magnetic ring limiting members 203 are integrally formed with the motor shell 2 by using injection molding process, and the fixing end 32 of the hollow metal motor shaft 3 is fixedly connected to the bottom plate 202 by using injection molding process.

The motor shell 2 is provided with the lead trough 10 which is arranged on an outer side of the bottom plate 202 and radially extends along the bottom plate 202, and is communicated with the interior of the hollow metal motor shaft 3.

Figure 6:
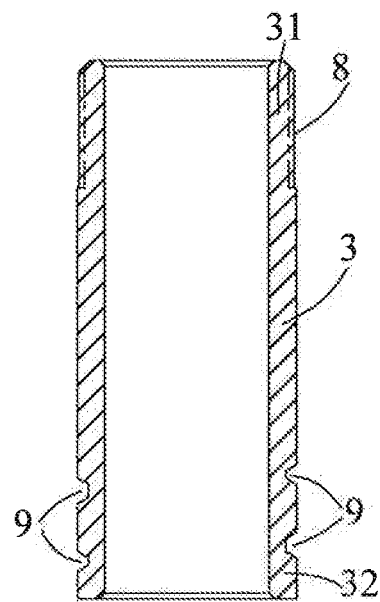
FIG. 6 is an enlarged sectional view of a hollow metal motor shaft of FIG. 5.

FIG. 6 is an enlarged sectional view of the hollow metal motor shaft of FIG. 5. As shown in FIG. 6, the hollow metal motor shaft 3 is tubular, and a plurality of groove-shaped stopping structures 9 are formed on an outer wall of the fixing end 32. A threaded fastening structure 8 is formed at the locking end 31 of the hollow metal motor shaft 3.

Figure 7:
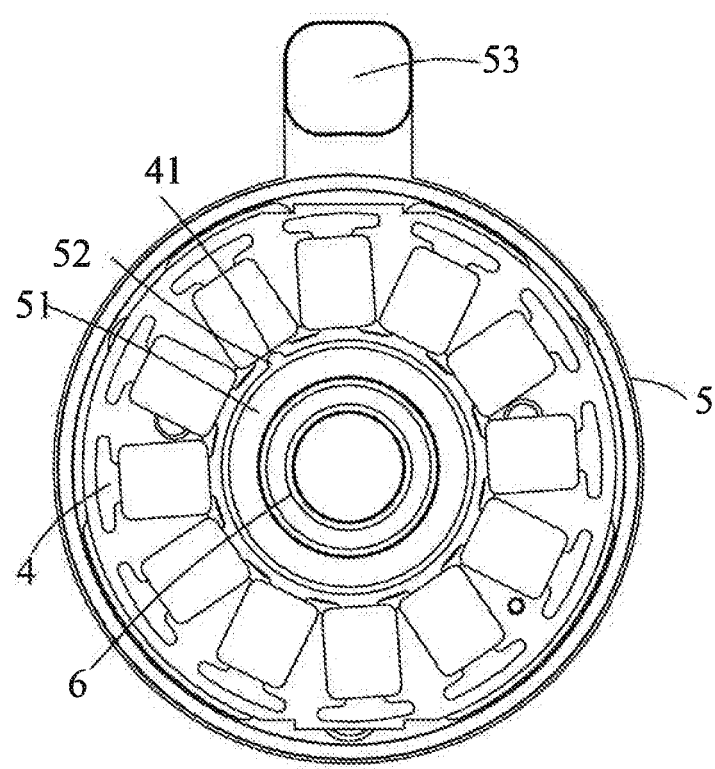
FIG. 7 is an enlarged planar view of motor iron cores and an iron core carrier of FIG. 2 in a direction shown by an arrow A1.

FIG. 7 is an enlarged planar view of the iron core carrier of FIG. 2 in a direction shown by an arrow A1. As shown in FIG. 7, the motor iron cores 4 are mounted on the iron core carrier and arranged along the iron core carrier radially and uniformly, an annular boss 51 is provided in vicinity of the center of the iron core carrier, and a limiting projection 52 is provided on an outer wall of the annular boss 51. A limiting groove 41 fitted with the limiting projection is provided on an inner side of the motor iron core 4. During the assembly of the motor iron cores 4 and the iron core carrier 5, the limiting groove 41 of the motor iron core 4 is first aligned with the limiting projection on the outer wall of the annular boss 51 in a direction parallel to the central axis L1, and then the annular boss 51 is sheathed in the motor iron core 4 to achieve fixed connection of the two.

Figure 8:
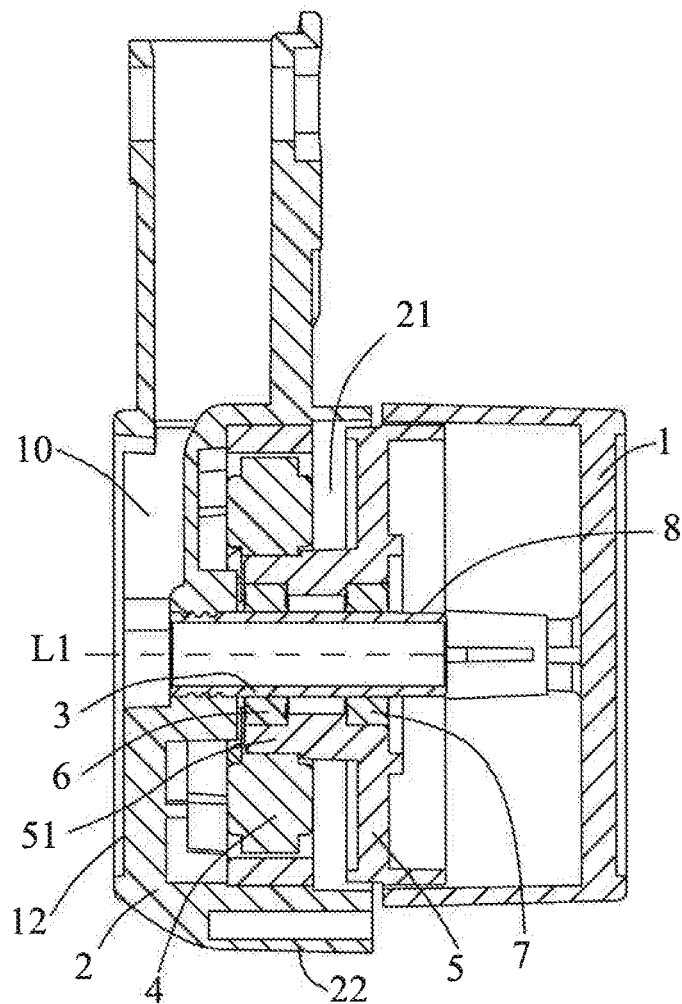
FIG. 8 is a sectional view of the first plastic motor for the handheld stabilizer shown in FIG. 1.

FIG. 8 is a sectional view of the first plastic motor 1' used for the handheld stabilizer of FIG. 1, with the sectional plane going through the central axis L1 and the line B-B'. As shown in FIG. 8, the iron core carrier 5 comprises the annular boss 51 which uses the central axis L1 as a rotation axis. The motor iron core 4 is substantially annular, and its inner wall firmly surrounds the outer wall of the annular boss 51 and the two are fixedly connected. The plastic motor 1' further comprises an upper bearing 6 and a lower bearing 7 opposite to each other. The upper bearing 6 and the lower bearing 7 are fixed on the iron core carrier 5 and use the central axis L1 as a rotation axis as well. The hollow metal motor shaft 3 passes through the upper bearing 6 and the lower bearing 7, and can perform free rotation movement around the central axis L1.

Therefore, according to one aspect of the present invention, a plastic motor for a handheld stabilizer is provided, comprising an upper bearing 6, a lower bearing 7, motor iron cores 4, an iron core carrier 5, a motor shell 2 and a motor end cover 1, wherein one end of the iron core carrier 5 is detachably connected with the motor end cover 1 and the other end thereof carries the motor iron cores 4; at least one of the iron core carrier 5, the motor shell 2 and the motor end cover 1 is made of plastic material; the plastic motor further comprises a hollow metal motor shaft 3, the motor shell 2 is fixedly connected to one end of the hollow metal motor shaft 3, the hollow metal motor shaft 3 passes through the upper bearing 6, the iron core carrier 5 and the lower bearing 7 in sequence, and a locking structure 8 is provided at the other end of the hollow metal motor shaft 3.

The plastic material of the plastic motor is polyaryl amides.

The iron core carrier 5, the motor shell 2 and the motor end cover 1 of the plastic motor 1' according to the above embodiment are made of polyaryl amides, which have light weight, great appearance designability and thus are suitable for commercial applications. Polyaryl amides have great chemical resistance and high strength and hardness, so that the motor keeps great stability. Also, polyaryl amides are easy to mold and don not need technological processes such as polishing and cleaning, so that the production efficiency is improved and the manufacturing cost is reduced. It is proved by tests on the tensile and flexural strength that the tensile and flexural strength of polyaryl amides is superior to that of common plastic, and the price is lower than that of metal material.

According to the above embodiment of the present invention, the hollow metal motor shaft 3 is made of metal material, which has high processing precision and high mechanical strength and is less likely to deform during usage. Projections fitted with the groove-shaped stopping structures 9 on the fixing end 32 of the hollow metal motor shaft 3 are formed on the motor shell 2 by using injection molding process, so that the motor shell 2 and the hollow metal motor shaft 3 are firmly fixed together, and the stability of the motor shell 2 and the hollow metal motor shaft 3 during rotation is improved. Threads are provided on an outer wall of the locking end 31 of the hollow metal motor shaft 3 and is used for connecting with nuts (not shown) to prevent the motor iron cores 4 and the iron core carrier 5 from sliding along the direction of the central axis L1, so that the plastic motor 1' can operate stably.

The limiting projection of the annular boss 51 is fitted and is fixedly connected with the limiting groove 41 of the motor iron core 4, which prevents the motor iron cores 4 from rotating relative to the iron core carrier 5 around the central axis L1, so that the operational stability of the plastic motor 1' is improved.

When the first plastic motor 1' is in the assembled state, the locking end 31 of the hollow metal motor shaft 3 passes through the upper bearing 6 and the lower bearing 7 in sequence. During anticlockwise or clockwise rotation of the housing 12 around the axis L1, the rotary stopper 22 of the housing 12 is blocked by the rotary limiting member 53. Therefore, the rotatable angle of the housing 12 is slightly smaller than 360°, which prevents leads provided in the hollow metal motor shaft 3 and the lead trough 10 from being twisted off due to excessive rotation.

Figure 9:
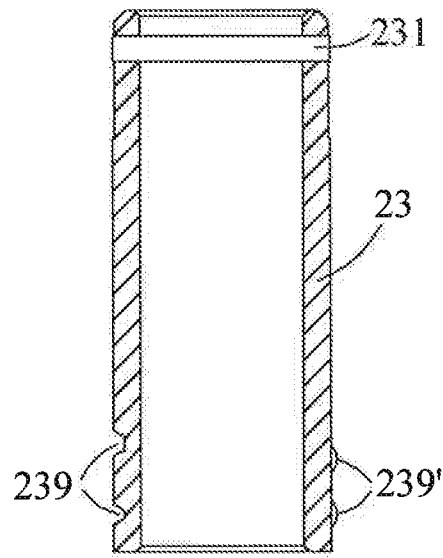
FIG. 9 is an enlarged sectional view of a hollow metal motor shaft in a plastic motor for a handheld stabilizer according to a second embodiment of the present invention.

FIG. 9 is an enlarged sectional view of a hollow metal motor shaft in a plastic motor for a handheld stabilizer according to a second embodiment of the present invention. A hollow metal motor shaft 23 shown in FIG. 9 is basically the same as the hollow metal motor shaft 3 shown in FIG. 6, and the difference lies in that there are a plurality of grooves 239 and a plurality of projections 239' on an outer wall of a fixed end of the hollow metal motor shaft 23 and a snap-fit structure 231 is provided on its locking end for detachably connecting with a fastener.

Figure 10:
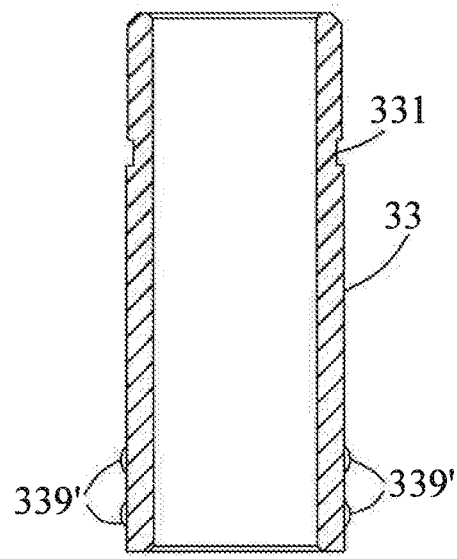
FIG. 10 is an enlarged sectional view of a hollow metal motor shaft in a plastic motor for a handheld stabilizer according to a third embodiment of the present invention.

FIG. 10 is an enlarged sectional view of a hollow metal motor shaft in a plastic motor for a handheld stabilizer according to a third embodiment of the present invention. A hollow metal motor shaft 33 shown in FIG. 10 is basically the same as the hollow metal motor shaft 3 shown in FIG. 6, and the difference lies in that there are a plurality of projections 339' on an outer wall of a fixed end of the hollow metal motor shaft 33 and a mortise structure 331 is provided on its locking end for detachably connecting with a tenon structure.

The stopping structure 9 is arranged on an end of the hollow metal motor shaft 3 fixedly connected with the motor shell 2.

The stopping structure 9 is one or more of a convex structure, a concave structure and an irregularly deformed structure.

The annular boss 51 is arranged on the iron core carrier 5, and the limiting structure 52 in a circumferential direction is arranged on the outer wall of the annular boss 51 and the inner wall of the motor iron core.

The limiting structure 52 is a matching structure of groove and projection.

In other embodiments of the present invention, a groove is provided in the outer wall of the annular boss of the iron core carrier. In this case, a projection fitted with the groove is provided on the inner wall of the motor iron core.

The motor shell 2 is made of plastic material, and the connection between the motor shell 2 and the hollow metal motor shaft 3 is one of injection molding connection, glue connection and interference connection.

In other embodiments of the present invention, it is not limited that there is a groove and/or a projection on the outer wall of the fixing end of the hollow metal motor shaft, and there may also be one or more of a convex structure, a concave structure and an irregularly deformed structure. The locking end of the hollow metal motor shaft is not limited to a threaded structure, a mortise and tenon structure and a snap-fit structure, and it may also be other fastening structures suitable for detachable connection.

The locking structure 8 of the hollow metal motor shaft 3 may be one of a threaded structure, a mortise and tenon structure and a snap-fit structure.

The iron core carrier 5 is connected with the motor end cover 1 by the nuts 11.

In other embodiments of the present invention, the iron core carrier is fixedly connected with the motor end cover by a snap-fit structure or a binder.

Figure 11:
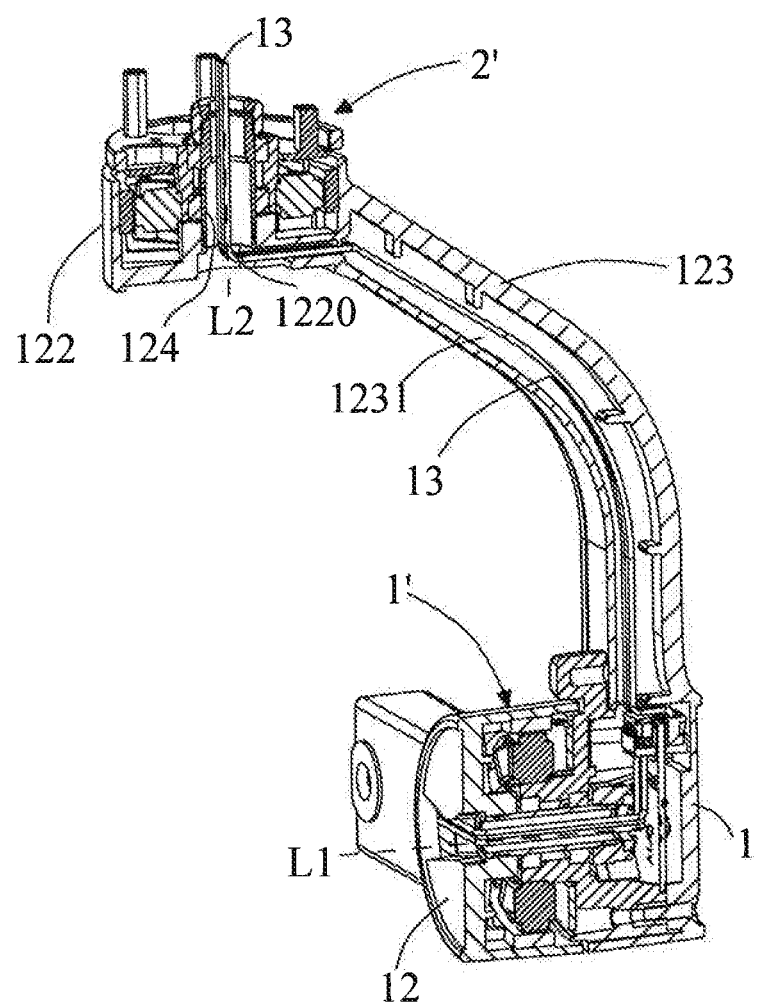
FIG. 11 is a sectional view of the handheld stabilizer of FIG. 1.

FIG. 11 is a sectional view of the handheld stabilizer of FIG. 1, wherein the sectional plane is a plane determined by central axes L1 and L2. As shown in FIG. 11, the housing 122 of the second plastic motor 2' is the same as the housing 12 of the first plastic motor 1', and a lead trough 1220 of the housing 122 is communicated with the interior of a hollow metal motor shaft 124 of the second plastic motor 2' as well. The connecting arm 123 connects the housing 122 of the second plastic motor 2' and the motor end cover 1 of the first plastic motor 1'. The connecting arm 123 is provided with a wiring groove 1231 which is communicated with the lead trough 1220 of the housing 122 and the interior of the motor end cover 1 of the first plastic motor 1'.

Some of leads in a lead strand 13 passing through the interior of the handle 127 (referring to FIG. 12) of the handheld stabilizer are used for powering the second plastic motor 2', and some of the leads pass through the interior of the hollow metal motor shaft 124, the lead trough 1220 of the housing 122 and the wiring groove 1231 of the connecting arm 123 in sequence to reach the interior of the motor end cover 1 and are used for powering the first plastic motor 1'. In this way, it is convenient to arrange the lead strand 13 in the hollow metal motor shaft 124, the lead trough 1220 and the wiring groove 1231 without having to additionally provide a junction box on an outer wall of the plastic motor for arranging the leads. If it is needed to power a third motor, a third part of leads in the lead strand 13 can pass through the hollow metal motor shaft and the lead trough 10 on the housing 12 to reach a motor end cover of the third motor.

Figure 12:
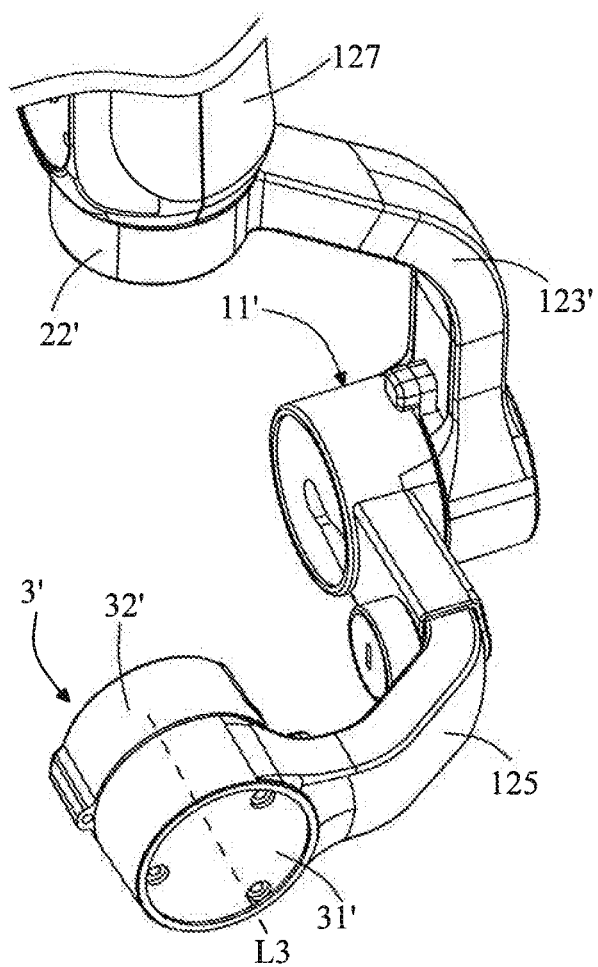
FIG. 12 is a schematic perspective view of a part of the handheld stabilizer according to the second embodiment of the present invention.

FIG. 12 is a schematic perspective view of a part of the handheld stabilizer according to the second embodiment of the present invention. FIG. 12 shows a part of the handheld stabilizer of FIG. 1, and a third plastic motor 3' and a connecting arm 125. A central axis L3 of the third plastic motor 3' is perpendicular to a central axis of a first plastic motor 11', thereby forming a three-axis handheld stabilizer.

The third plastic motor 3' similarly comprises a motor end cover 31' and a housing 32'. The connecting arm 125 fixedly connects the motor end cover 31' of the third plastic motor 3' and a housing of the first plastic motor 11' together. Some of leads arranged in the interior of the handle 127 pass through the interior of a hollow metal motor shaft of a second plastic motor 22', a lead groove of a housing of the second plastic motor 22', a wiring groove of a connecting arm 123', the interior of a motor end cover of the first plastic motor 11', a hollow metal motor shaft of the first plastic motor 11', a lead groove of the housing of the first plastic motor 11' and a wiring groove of the connecting arm 125 in sequence to reach the interior of the motor end cover 31' of the third plastic motor 3' for powering the third plastic motor 3'.

In this embodiment, the connecting arm 123' is used for connecting the housing of the second plastic motor 22' and the motor end cover of the first plastic motor 11', and thus the connecting arm 123' and the housing of the second plastic motor 22' can perform free clockwise or anticlockwise rotation around the handle 127. The connecting arm 125 is used for connecting the housing of the first plastic motor 11' and the motor end cover 31' of the third plastic motor 3', such that the connecting arm 125 and the housing of the first plastic motor 11' can perform free clockwise or anticlockwise rotation around the central axis of the first plastic motor 11', and the housing 32' of the third plastic motor 3' can perform free clockwise or anticlockwise rotation around its central axis L3.

In the plastic motor for the handheld stabilizer, one or more components of the iron core carrier, the motor shell and the motor end cover are made of plastic material, so that complex technological processes such as polishing and cleaning during the production of the existing metal motor are avoided, the production efficiency is improved and the cost is reduced. The hollow metal motor shaft is fixedly connected with the plastic motor shell by injection molding, glue and interference, so that it is less likely for the motor shaft to deform after loading. Meanwhile, the hollow motor shaft and lead trough are used, which facilitates the threading of the handheld stabilizer. The stopping structure is additionally provided to the end of the hollow metal motor shaft fixedly connected with the motor shell, so that the stability of the motor during usage is increased and the service life of the motor is prolonged. The limiting structure in the circumferential direction is additionally provided to the outer wall of the annular boss and the inner wall of the motor iron core, so that the stability of the motor during usage is increased. Polyaryl amides are used, so that the strength, the hardness, the chemical resistance and the dimensional stability of the motor are improved, and the motor can maintain great stability in the case of high load.

Although the present invention has been described by way of preferred embodiments, the present invention is not limited thereto and further comprises various modifications and variations made without departing from the scope of the present invention.

The invention claimed is:

1. A plastic motor for a handheld stabilizer, characterized in that it comprises:
a motor shell;
a hollow metal motor shaft, wherein one end of the hollow metal motor shaft is fixedly connected to the motor shell;
a motor end cover;
motor iron cores;
an iron core carrier, wherein one end of the iron core carrier is detachably connected to the motor end cover and the other end thereof carries the motor iron cores, and at least one of the iron core carrier, the motor shell and the motor end cover is made of plastic material; and
an upper bearing and a lower bearing, wherein the upper bearing and the lower bearing are fixed on the iron core carrier, and the hollow metal motor shaft passes through the upper bearing, the iron core carrier and the lower bearing;
wherein a stopping component fixedly connected with an inner side of the motor shell is provided on an outer side of one end of the hollow metal motor shaft; and
wherein the motor shell is made of plastic material, and the connection between one end of the hollow metal motor shaft and the motor shell is injection molding connection, glue connection or interference connection.

2. The plastic motor according to claim 1, characterized in that a locking structure is provided at the other end of the hollow metal motor shaft.

3. The plastic motor according to claim 2, characterized in that the locking structure of the hollow metal motor shaft is a threaded structure, a mortise and tenon structure or a snap-fit structure formed on an outer wall of the other end of the hollow metal motor shaft.

4. The plastic motor according to claim 1, characterized in that the motor end cover and the motor shell are arranged opposite to each other, and the iron core carrier is arranged in the interior of the motor shell and the motor end cover.

5. The plastic motor according to claim 1, characterized in that the stopping component at one end of the hollow metal motor shaft is at least one of a groove, a projection and an irregularly deformed structure.

6. The plastic motor according to claim 1, characterized in that the plastic material of the motor shell is polyaryl amides.

7. The plastic motor according to claim 6, characterized in that the motor shell is of a cylindrical shape with one end open and comprises an annular wall and a bottom plate, the hollow metal motor shaft is arranged on a central axis of the motor shell, and one end of the hollow metal motor shaft is fixedly connected with an inner side of the bottom plate.

8. The plastic motor according to claim 6, characterized in that the iron core carrier comprises an annular boss, and an outer wall of the annular boss is fixedly connected with an inner wall of the motor iron core.

9. The plastic motor according to claim 1, characterized in that the motor shell is of a cylindrical shape with one end open and comprises an annular wall and a bottom plate, the
hollow metal motor shaft is arranged on a central axis of the motor shell, and one end of the hollow metal motor shaft is fixedly connected with an inner side of the bottom plate.

10. The plastic motor according to claim 9, characterized in that a lead trough is provided in an outer side of the bottom plate, and the lead trough is communicated with the interior of the hollow metal motor shaft.

11. The plastic motor according to claim 9, characterized in that reinforcing ribs are provided on the inner side of the bottom plate.

12. The plastic motor according to claim 11, further comprising a magnetic ring and a plurality of magnetic ring limiting members provided on an inner side of the annular wall, wherein one end of each of the magnetic ring limiting members is fixed to an end of the reinforcing rib and the other end thereof is abutted against the magnetic ring.

13. The plastic motor according to claim 9, characterized in that a rotary stopper is provided on an outer wall of the annular wall, and a rotary limiting member is provided on the outer edge of the iron core carrier.

14. The plastic motor according to claim 1, characterized in that the iron core carrier comprises an annular boss, and an outer wall of the annular boss is fixedly connected with an inner wall of the motor iron core.

15. The plastic motor according to claim 14, characterized in that a limiting projection is provided on the outer wall of the annular boss, and a limiting groove fitted with the limiting projection is provided on the inner wall of the motor iron core; or a limiting groove is provided on the outer wall of the annular boss, and a limiting projection fitted with the limiting groove is provided on the inner wall of the motor iron core.

16. A handheld stabilizer, characterized in that it comprises:
two plastic motors according to claim 15; and
connecting arm used for fixedly connecting a motor end cover of a first plastic motor of the two plastic motors and a motor shell of a second plastic motor of the two plastic motors, wherein a wiring groove is provided in the connecting arm, and the wiring groove is communicated with the interior of a hollow metal motor shaft of the second plastic motor.

17. A handheld stabilizer, comprising:
three plastic motors according to claim 15;
a first connecting arm, wherein the first connecting arm fixedly connects a motor end cover of a first plastic motor of the three plastic motors and a motor shell of a second plastic motor of the three plastic motors, a first wiring groove is provided on the first connecting arm, and the first wiring groove is communicated with the interior of a hollow metal motor shaft of the second plastic motor;
and a second connecting arm, wherein the second connecting arm fixedly connects a motor shell of the first plastic motor and a motor end cover of a third plastic motor of the three plastic motors, a second wiring groove is provided on the second connecting arm, and the second wiring groove is communicated with the interior of a hollow metal motor shaft of the first plastic motor.

18. A handheld stabilizer, characterized in that it comprises:
two plastic motors according to claim 1; and
connecting arm used for fixedly connecting a motor end cover of a first plastic motor of the two plastic motors and a motor shell of a second plastic motor of the two plastic motors, wherein a wiring groove is provided in the connecting arm, and the wiring groove is communicated with the interior of a hollow metal motor shaft of the second plastic motor.

19. A handheld stabilizer, comprising:
three plastic motors according to claim 1;
a first connecting arm, wherein the first connecting arm fixedly connects a motor end cover of a first plastic motor of the three plastic motors and a motor shell of a second plastic motor of the three plastic motors, a first wiring groove is provided on the first connecting arm, and the first wiring groove is communicated with the interior of a hollow metal motor shaft of the second plastic motor; and
a second connecting arm, wherein the second connecting arm fixedly connects a motor shell of the first plastic motor and a motor end cover of a third plastic motor of the three plastic motors, a second wiring groove is provided on the second connecting arm, and the second wiring groove is communicated with the interior of a hollow metal motor shaft of the first plastic motor.

* * * * *